June 23, 1953
A. ALLEN
2,642,944
APPARATUS FOR CLEARING CONDUITS IN DRY
CHEMICAL FIRE-EXTINGUISHING SYSTEMS
Filed Jan. 31, 1951
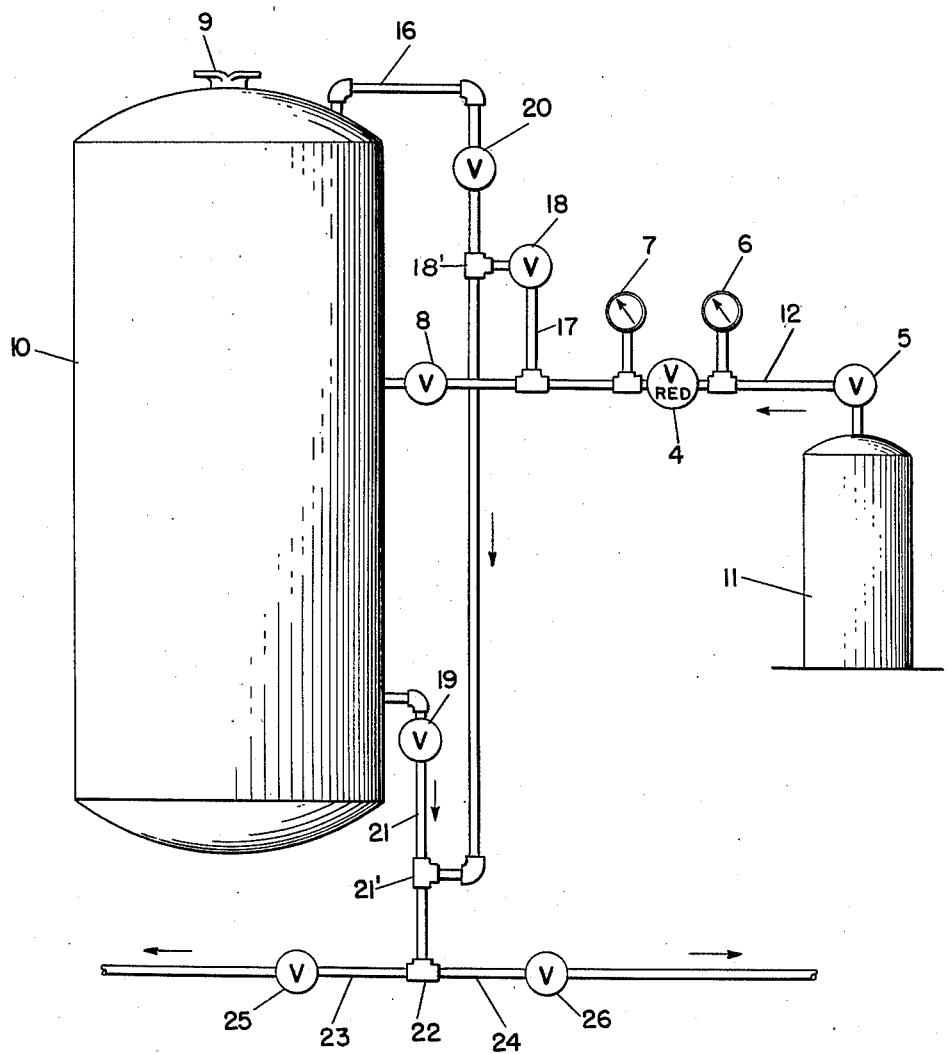
INVENTOR.
*ALDEN ALLEN*
BY
ATTORNEY Patented June 23, 1953

2,642,944

UNITED STATES PATENT OFFICE 2,642,944

APPARATUS FOR CLEARING CONDUITS IN DRY CHEMICAL FIRE-EXTINGUISHING SYSTEMS

Alden Allen, Menominee, Mich., assignor to Ansul Chemical Company, Marinette, Wis., a corporation of Wisconsin Application January 31, 1951, Serial No. 208,824

9 Claims. (Cl. 169—11)

This invention relates to the apparatus and method for clearing and checking the discharge conduits of fire-extinguishing systems employing powdered dry chemical as the fire-extinguishing agent. More specifically, this invention relates to the use of the residual gas pressure in a storage container of dry chemical fire-extinguishing powder for clearing the discharge conduits of dry chemical remaining in said conduits following use of the fire-extinguishing apparatus.

When a fire is extinguished before the entire contents of dry chemical fire-extinguishing equipment are discharged, the hose conduits contain dry chemical under considerable pressure which is densely packed therein. If the pressure in the dry chemical is relieved without the dry chemical being cleared from the hose conduits, the fire-extinguishing apparatus may be in an inoperative condition when next used.

In the past, where dry chemical fire-extinguishing equipment not fitted with trunnions, such as wheeled equipment, has been partially discharged, the hose conduits have been cleared of dry chemical by closing the outlet valve at the dry chemical container, closing the valve admitting fluidizing and expellant gas to the dry chemical container, and opening a third valve which admits the expellant gas only to the discharge conduit externally of the dry chemical outlet valve at the dry chemical container. This expellant gas serves to clear the discharged conduits. However, it sometimes has been objectionable to use the remaining expellant gas in the gas cylinder since it could be possible to recharge the dry chemical container and thus furnish immediate fire protection without replacing the gas cylinder. On the other hand, the residual gas in the dry chemical container was merely exhausted to the atmosphere to relieve the pressure in the dry chemical container to allow it to be opened for refilling with dry chemical.

This invention utilizes the residual gas pressure within the dry chemical container for clearing the discharge conduit of remaining dry chemical. This is accomplished by connecting a pressure relief conduit at the top of the dry chemical tank to the dry chemical discharge conduit externally of the dry chemical outlet valve at the dry chemical container. By such a connection, it is possible to not only relieve the pressure within the dry chemical container, but to simultaneously blow the discharge conduit clear of all remaining dry chemical.

Further details and advantages of the invention will be apparent from the following specification and accompanying diagrammatic drawing wherein is represented an apparatus comprising a metal cylindrical storage tank 10, having a removable closure 9, for storing therein dry chemical fire-extinguishing powder containing essentially sodium bicarbonate, for example as disclosed in Patent 1,793,420, February 17, 1931. Such dry powdered composition is fluidized by an inert gas, such as nitrogen, supplied from a metal cylinder 11 where it is stored under a pressure of about 2000 lbs. per square inch and is fed through conduit 12 to tank 10 to fluidize the dry chemical stored therein in any well-known suitable manner. A valve 5 controls the flow of expellant gas through conduit 12 to the tank 10. The fluidized dry chemical is expelled from the tank 10 through supply conduits 21, 23 and 24. Cut-off valve 19 in conduit 21 is normally open and is closed when it is desired to prevent the reverse flow of gas pressure into tank 10, as will be explained later. Supply conduit 21 is connected by a fitting 22 to supply conduits 23 and 24, controlled, respectively, by valves 25 and 26, for supplying streams of fluidized dry chemical in one or more conduits as desired.

The top of tank 10 is connected by a pressure relief conduit 16 to the fluidized dry chemical supply conduit 21 at a point 21' which is down stream past the valve 19, that is, externally thereof. A valve 20 controls the flow of gas pressure through conduit 16. Gas supply conduit 12 is also provided with a valve 8 which is normally open and can be closed for cutting off the flow of gas into chamber 10 when desired. Conduit 12 is provided with a suitable pressure-reducing valve 4, and also with high pressure gauge 6 and low pressure gauge 7. The expellant gas supply conduit 12 is also connected through a valve 18 and by-pass conduit 17 to relief conduit 16 at a point 18' externally or below relief valve 20.

When it is desired to supply a stream of fluidized dry chemical using the apparatus described, the fluidized dry chemical outlet valves 25 and 26 are initially closed. Valves 18 and 20 are also closed. Valve 19 is open. Gas cut-off valve 8 is open.

Gas under pressure from tank 11 is supplied by opening valve 5 which permits, for example, nitrogen gas under pressure of about 2000 lbs. per square inch to enter conduit 12 as indicated by high pressure gauge 6. The gas pressure is reduced by pressure reducing valve 4 to about 200 lbs. per square inch, for example, as indicated by low pressure gauge 7. The gas under the reduced pressure will then pass through valve 8 into tank 10 where it will fluidize the dry chemical therein and pressurize the tank sufficiently to expel a stream of fluidized dry chemical through conduit 21 when either valve 25 or 26 or both are opened for fire-extinguishing purposes.

In order to clear the dry chemical supply conduits 21, 23 and 24 and relieve the pressure within the dry chemical container 10, after using the apparatus for extinguishment of a fire, the valves 8 and 19 are closed. The valve 5 is then also closed to shut off the flow of expellant gas into tank 10 from conduit 12. Supply valves 25 and 26 remain open. Valve 20 is then opened to permit pressure in tank 10 to be relieved through conduit 16 and to pass into conduit 21 whereby conduits 21, 23 and 24 will be cleared of any dry chemical therein.

For maintenance purposes during the stand-by periods of the apparatus, it is desired to frequently check the pressure in the cylinder 11 and also to make sure outlet conduits 21, 23 and 24 are unobstructed. To accomplish this without going through the needless expense and work of pressurizing the entire system, valves 8, 19 and 20 are closed and valve 5 is opened to supply expellant gas to the pressure reducing valve 4. The pressure in cylinder 11 is then indicated by gauge 6. Valve 18 connecting the expellant gas conduit 12 to pressure relief conduit 16 is normally closed but by opening valves 18, 25 and 26 expellant gas will flow through outlet conduits 21, 23 and 24 clearing them of dry chemical or any other undesirable obstructions.

From the foregoing description it will be seen that a simple and efficient system is provided for supplying expellant gas pressure to a tank containing dry chemical with means to relieve the pressure in the tank as well as means to clear the dry chemical supply conduit. Means are also provided for checking the expellant gas supply without operating the dry chemical tank or discharging fluidized dry chemical therefrom.

Modifications and changes may be made of the various details of the invention herein described which are intended to be included within the scope of the appended claims.

I claim:

1. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit, and a pressure relief valve in said relief conduit.

2. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit at a point internally of the said outlet valve in said outlet conduit, and a pressure relief valve in said relief conduit.

3. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit, a pressure relief valve in said relief conduit, and a by-pass conduit connecting said gas supply conduit at a point externally of the said gas control valve in said gas supply conduit to said relief conduit at a point externally of said relief valve and a valve in said by-pass conduit.

4. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit at a point internally of the said outlet valve in said outlet conduit and a valve in said outlet conduit positioned internally of said pressure relief conduit, a pressure relief valve in said relief conduit, and a by-pass conduit connecting said gas supply conduit at a point externally of the said gas control valve in said gas supply conduit to said relief conduit at a point externally of said relief valve and a valve in said by-pass conduit.

5. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a gas shut-off valve in said conduit to prevent reverse flow in said conduit, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit, and a pressure relief valve in said relief conduit.

6. Fire-extinguishing apparatus for supplying a fluidized stream of dry chemical which comprises a tank for storing dry chemical, a gas supply conduit to supply fluidizing and pressurizing gas to said tank, a reducing valve in said gas supply conduit to reduce the initial pressure of said gas to a predetermined pressure, a gas control valve in said conduit to control the flow of gas to said tank, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit, and a pressure relief valve in said relief conduit.

7. Fire-extinguishing apparatus for supplying a fluidized stream of dry chemical which comprises a tank for storing dry chemical, a gas supply conduit to supply fluidizing and pressurizing gas to said tank, a reducing valve in said gas supply conduit to reduce the initial pressure of said gas to a predetermined pressure, a gas control valve in said conduit to control the flow of gas to said tank, a gas shut-off valve in said conduit to prevent reverse flow in said conduit, a fluidized dry chemical outlet conduit connected to said tank, an outlet valve in said outlet conduit to control the flow of fluidized dry chemical, a pressure relief conduit connecting the upper portion of said tank to said fluidized dry chemical outlet conduit at a point internally of the said outlet valve in said outlet conduit and a valve in said outlet conduit positioned internally of said pressure relief conduit, a pressure relief valve in said relief conduit, and a by-pass conduit connecting said gas supply conduit at a point externally of the said gas control valve in said gas supply conduit to said relief conduit at a point externally of said relief valve and a valve in said by-pass conduit.

8. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a plurality of fluidized dry chemical outlet conduits connected to said tank, outlet valves in said outlet conduits to control the flow of fluidized dry chemical, a pressure relief conduit connecting the upper portion of said tank to said fluidized dry chemical outlet conduits at points internally of said outlet valves in said outlet conduits and a pressure relief valve in said relief conduit.

9. Fire-extinguishing apparatus for supplying a fluidized stream of dry chemical which comprises a tank for storing dry chemical, a gas supply conduit to supply fluidizing and pressurizing gas to said tank, a gas control valve in said conduit to control the flow of gas to said tank, a fluidized dry chemical outlet conduit connected to said tank, a plurality of divided outlets from said fluidized dry chemical outlet, outlet valves in said outlet conduits to control the flow of fluidized dry chemical, a pressure relief conduit connecting the upper portion of said tank to said fluidized dry chemical outlet conduit at a point internally of the said outlet valves in said outlet conduits and a pressure relief valve in said conduit.

ALDEN ALLEN.

References Cited in the file of this patent

UNITED STATES PATENTS

| Number | Name | Date |
|---|---|---|
| 2,473,349 | Snowden | June 14, 1949 |